United States Patent
Sauermann et al.

(10) Patent No.: US 7,257,599 B2
(45) Date of Patent: Aug. 14, 2007

(54) DATA ORGANIZATION IN A FAST QUERY SYSTEM

(75) Inventors: Volker Sauermann, Heidelberg (DE); Axel Von Bergen, Wiesloch (DE); Arne Schwarz, Walldorf (DE)

(73) Assignee: SAP Aktiengesellschaft, Walldorf (DE)

(*) Notice: Subject to any disclaimer, the term of this patent is extended or adjusted under 35 U.S.C. 154(b) by 793 days.

(21) Appl. No.: 10/637,004

(22) Filed: Aug. 8, 2003

(65) Prior Publication Data

US 2004/0139046 A1 Jul. 15, 2004

Related U.S. Application Data

(63) Continuation of application No. 10/470,720, filed as application No. PCT/EP02/01026 on Feb. 1, 2002, said application No. 10/637,004 is a continuation of application No. 10/470,716, filed as application No. PCT/EP02/01027 on Feb. 1, 2002.

(30) Foreign Application Priority Data

Feb. 1, 2001 (DE) ................................. 101 04 831

(51) Int. Cl.
*G06F 17/30* (2006.01)
(52) U.S. Cl. .................... 707/102; 707/3; 707/101; 706/45; 715/517
(58) Field of Classification Search ............ 707/3, 707/10, 100, 1, 101, 102; 706/45; 435/6; 715/517
See application file for complete search history.

(56) References Cited

U.S. PATENT DOCUMENTS

| | | | |
|---|---|---|---|
| 4,849,905 A | 7/1989 | Loeb et al. | |
| 5,355,473 A | 10/1994 | Au | |
| 5,557,786 A | 9/1996 | Johnson, Jr. | |
| 5,701,400 A * | 12/1997 | Amado | 706/45 |
| 5,737,732 A | 4/1998 | Gibson et al. | |
| 6,355,423 B1 * | 3/2002 | Rothberg et al. | 435/6 |
| 6,675,173 B1 * | 1/2004 | Shadmon | 707/102 |
| 7,016,910 B2 * | 3/2006 | Egilsson et al. | 707/101 |
| 2002/0032676 A1 | 3/2002 | Wheat et al. | |

FOREIGN PATENT DOCUMENTS

| | | |
|---|---|---|
| EP | 0 657 830 A1 | 6/1995 |
| WO | WO 02/061612 A | 8/2002 |
| WO | WO 02/061613 A | 8/2002 |

OTHER PUBLICATIONS

Date, C.J., "Introduction to Database Systems, vol. 1," 1990, Addison Wesley, Reading, MA, USA, paragraph '03.6!, figs. 3.17 and 3.18.
Haerder, Theo and Erhard Rahm, "Datenbanksysteme," 1999, Springer, Heidelberg, pp. 207-210, 227-233, figs. 7.15, 8.1 and 8.2.B, English translation provided, 10 pgs.

* cited by examiner

*Primary Examiner*—Shahid Al Alam
(74) *Attorney, Agent, or Firm*—Fish & Richardson P.C.

(57) ABSTRACT

Techniques are described for organizing data in a fast query system. Data structures are provided, where each of the data structures forms part of at least one traversable structure and represents at least a first value of a first attribute of a data record forming a body of data records. Each of at least some of the data structures are associated with at least one other data structure forming part of another traversable structure, where the other data structure represents at least a second value of a second attribute of the data record.

14 Claims, 8 Drawing Sheets

DATA ORGANIZATION IN A FAST QUERY SYSTEM

CROSS-REFERENCE TO RELATED APPLICATIONS

This application is a continuation of U.S. application Ser. No. 10/470,720, filed Dec. 18, 2003, which is a national phase filing of PCT International Application PCT/EP02/01026 (published as WO 02/061612), which has an international filing date of Feb. 1, 2002. This application also is a continuation of U.S. application Ser. No. 10/470,716, filed Dec. 18, 2003, which is a national phase filing of PCT International Application PCT/EP02/01027 (published as WO 02/061613), which has an international filing date of Feb. 1, 2002. Both PCT International Applications PCT/EP02/01026 and PCT/EP02/01027 claim priority to German patent application no. 101 04 831.9 DE, filed Feb. 1, 2001.

TECHNICAL FIELD

This disclosure is directed to a computer system and techniques for organizing data and responding to data queries.

BACKGROUND

A data store is any collection of information or data in a computer system such that the data is accessible by one or more software applications. For example, a file system populated with various files is a data store. When a data store is organized to facilitate search and retrieval of information contained within the data store, the data store is a database.

Data stores and databases may be used for a wide variety of applications that may need to perform tasks such as the following: (1) inserting data into the data store; (2) deleting data from the data store; (3) modifying data in the data store; (4) organizing data; (5) searching for data matching search criteria; or (6) retrieving data. Some data stores provide a query interface to provide a mechanism to facilitate some or all of these tasks. A query interface facilitating these tasks in a database system is referred to as a database management system (DBMS).

Efficient data stores form the basis for a wide variety of data-intensive applications, such as, for example, enterprise business applications.

SUMMARY

According to one general aspect, data structures are provided. Each of the data structures forms part of at least one traversable structure and each of the data structures is representative of at least a first value of a first attribute of a data record forming a body of data records. Each of at least some of the data structures is associated with at least one other data structure forming part of another traversable structure, and the other data structure is representative of at least a second value of a second attribute of the data record.

Implementations may have one or more of the following features. For example, the traversable structure may comprise a tree structure, and the body of data records may comprise a database. All of the data structures may comprise instances of a common class of data object, and the data object class may be capable of representing the relationships between values of different attributes.

Multiple instances of identical data values of at least one of the attributes may be represented by a single one of the data structures. The data structures and the data objects may contain both the references and the values of attributes.

Each of at least some of the data structures may include values representing the numbers of values appearing in other related data structures of the traversable structure. The data objects comprising a given one of the structures may share a data-type identifying value.

At least one of the data structures may represent duplicate values of an attribute of one of the traversable structures. In this case, ring pointers may be used to associate the duplicate values with one another.

The data structures may comprise references to other data structures within a given one of the traversable structures and references to data structures of other traversable structures. In this case, the data structures also may include references that are not either to other data objects of the given structure nor to data objects that are associated with values of different attributes of a given data record.

At least one of the data structures may include a selectable reference that may selectably refer to any other data structure within or outside of the same traversable structure. In this case, the selectable reference may identify a type of the data structure to which it refers. Further, the type may be identified using a flag or a condition graph.

The selectable reference may comprise a bridge, and the bridge may include references to more than two of the data objects. In this case, additional bridges may be included that are cascaded.

The traversable structure may be balanced, perhaps dynamically. The data structures that form the structure may form a complete ring. The values may be maintained separately from the traversable structures.

The details of one or more implementations are set forth in the accompanying drawings and the description below. Other features and advantages will be apparent from the description and drawings, and from the claims.

DETAILED DESCRIPTION

A data store is a collection of information encoded in a machine-based format, such as, for example, a database, a flat file, a spreadsheet, a file system, or any combination thereof. Applications may be provided to access a data store to search and retrieve the information (i.e., data) contained therein. Many business applications rely on data stores to store, search, and retrieve business data. As computation power increases, data store queries may bottleneck system performance. It is desirable to improve the performance of data store queries.

Information stored in a data store may be freeform, such as a text files, web pages, or articles, or it may be structured such as data records or XML files. Relational database management systems (RDBMS), such as Oracle, Sybase, DB2, SQL Server, and Informix, provide a mechanism for storing, searching, and retrieving structured data. For example, an RDBMS storing a customer list may facilitate searching and receiving customers records by fields such as name, company, or address. When fields are often used in data queries, the fields may be indexed in an RDBMS system to reduce the time needed to satisfy those queries. Indexing may reduce search times from linear time (e.g., searching each record for possible matches) to logarithmic time (e.g., using a tree-based indexing scheme) or to constant time (e.g., using a hash-based indexing scheme).

Freeform text search systems are sometimes implemented by creating structured data representing a freeform record. Then, structured data techniques may be applied to the freeform records. For example, a list of words in a web page may be used to create structured data linking the words to the web page. The structured data may be indexed and stored such that a user perform queries to identify web pages containing a particular word.

In RDBMS systems, data records are typically organized into tables. Each table includes one or more data records and each data record includes one or more fields. For example, a customer table may include a data record for each customer with each data record including fields such as the following: customer number, first name, last name, address, and telephone number. The performance of an RDBMS system may be improved by indexing fields that are often used in queries. For example, if users often search for customer numbers and last names, those fields may be indexed to reduce the time it takes to satisfy such queries. For example, a B-tree index may be used to reduce the search time from linear time to logarithmic time. In a conventional data query system, the indexes typically are created and stored apart from the data that is indexed.

Figure 1:
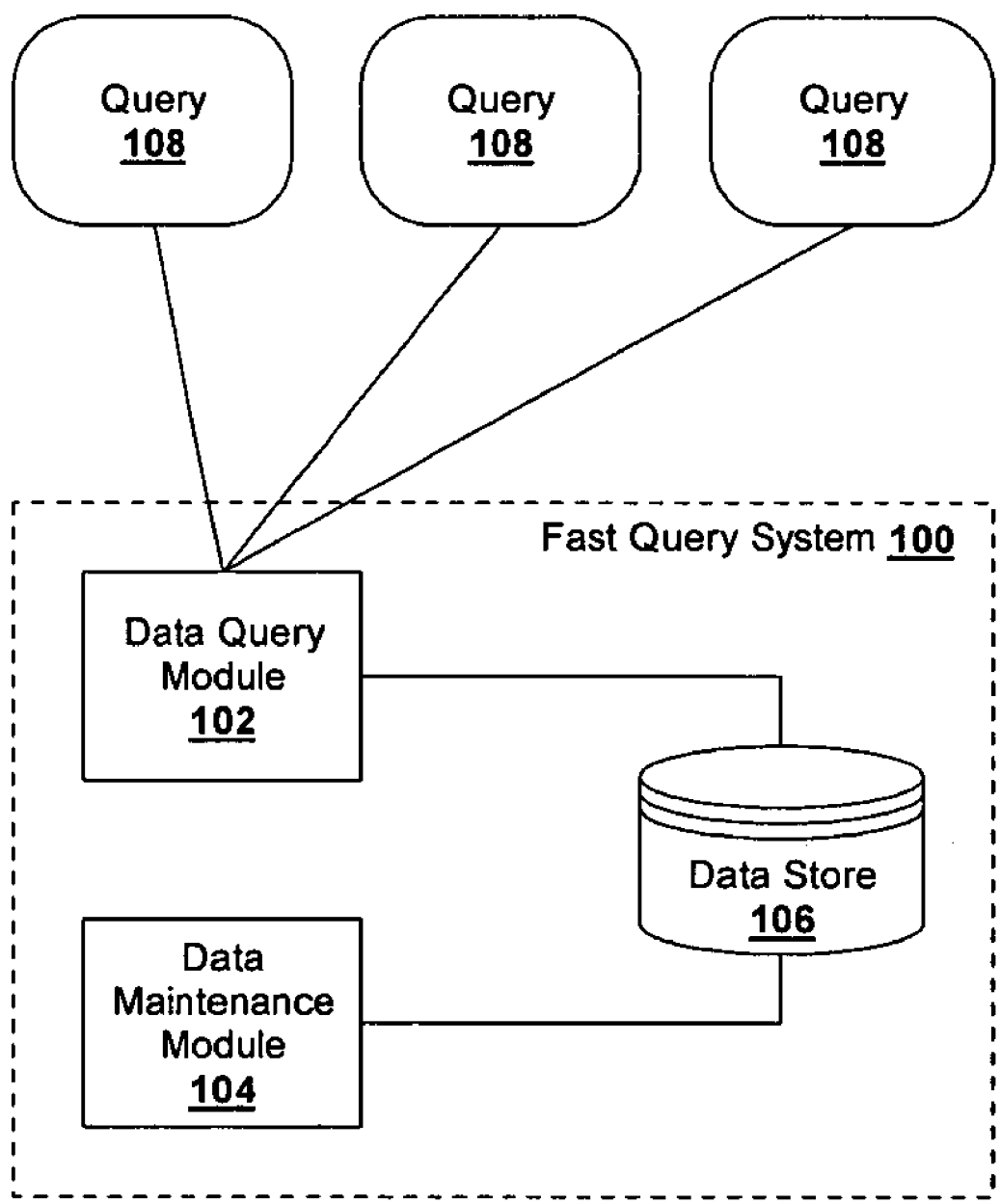
FIG. 1 is a block diagram of a data query system.

Referring to FIG. 1, a fast query system 100 includes a data query module 102, a data maintenance module 104, and a data store 106. The data query module 102 receives and processes queries 108. Data queries may be formulated in a proprietary query language, or in a standard query language such as the structured query language (SQL). The data maintenance module 106 may perform maintenance tasks such as data loads, backups, indexing, and optimization. The data maintenance module 106 may be used to load data from, for example, a flat file or RDBMS into the fast query system 100. Loaded data is stored in the data store 106 in a format to facilitate fast responses to queries as is described below with respect to FIGS. 2, 3, and 4.

In one implementation, the fast query system 100 receives a query 108 formulated in the SQL query language. The data query module 102 processes the query and returns data records from the data store 106 satisfying the query 108. For example, a business application may select all customer records corresponding to customers with a last name of "Smith" by sending the following query 108 to the fast query system 100:

SELECT*FROM Customer WHERE Name="Smith".

Figure 2:
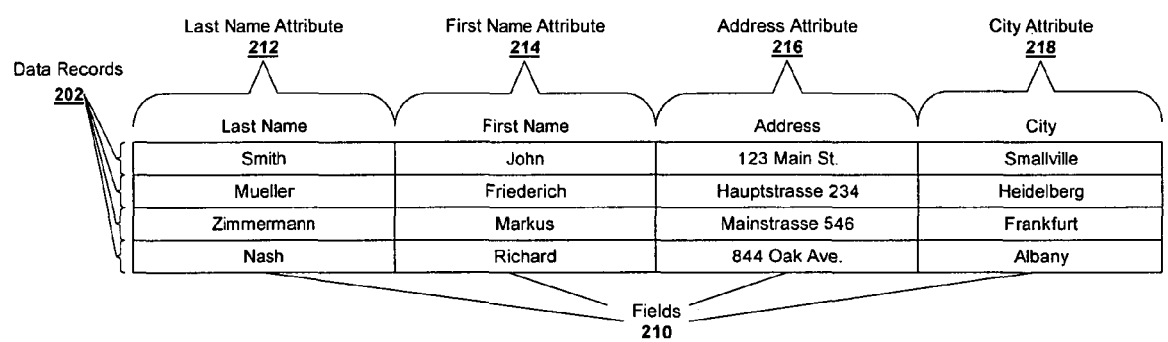
FIG. 2 is a diagram of a series of data records and their corresponding fields.

Referring to FIG. 2, the data store 106 maintains data in data structures to facilitate efficient search and retrieval. In a conventional RDBMS system, data is organized into tables with each table including data records 202 having one or more fields 210. In this example, each data record 202 includes a last name attribute 212, a first name attribute 214, an address attribute 216, and a city attribute 218. This data is maintained in the data store 106 in a tree structure. Each attribute is indexed to facilitate searching on a particular field 210 and each data record 202 is stored to facilitate retrieval of other fields 210 within a given data record 202.

Figure 3:
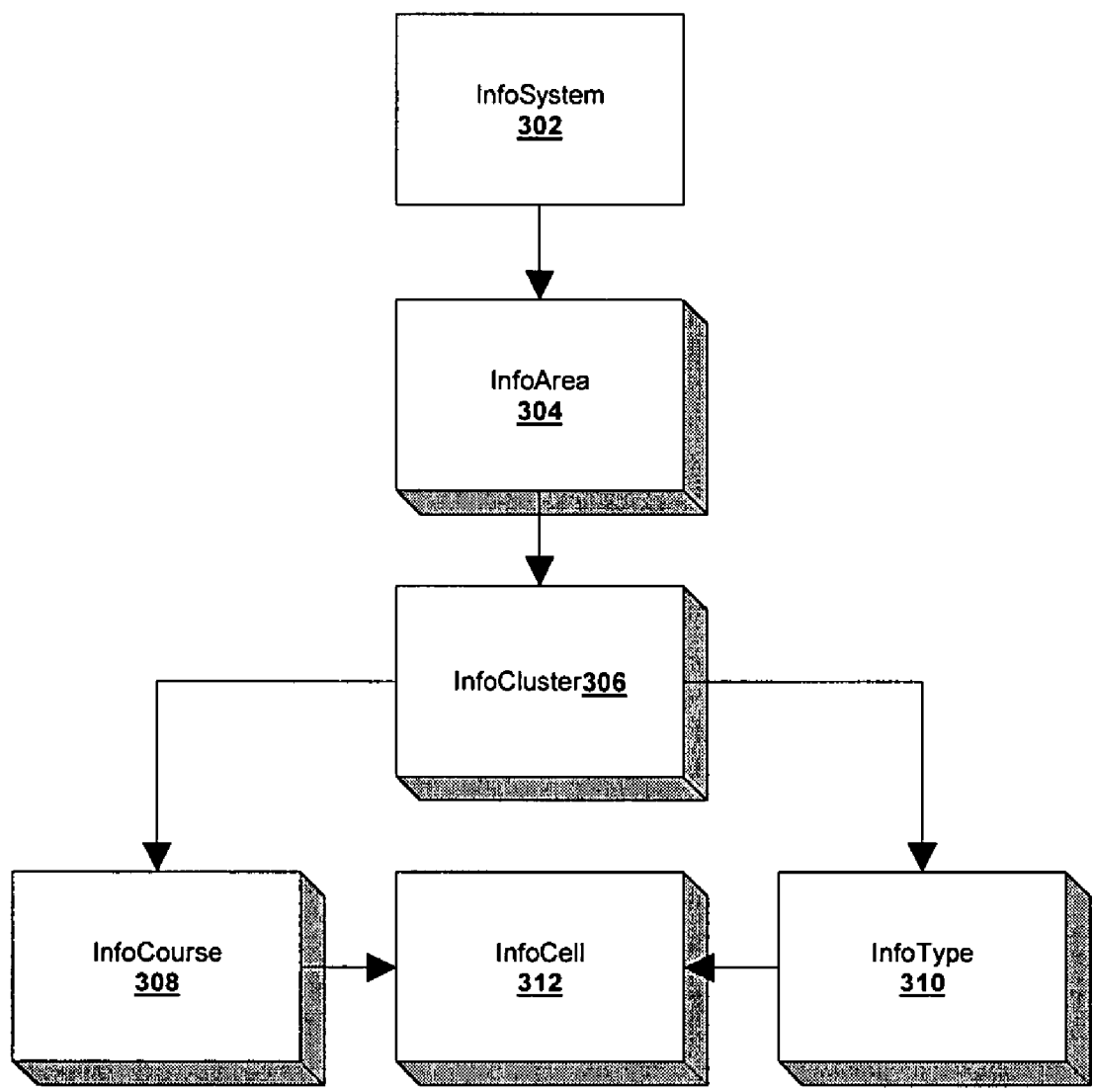
FIG. 3 is a block diagram of various data abstractions used in a fast query system to represent attributes and data records.

Referring to FIG. 3, in some implementations, the fast query system 100 is organized using the following abstractions. All data stored in a fast query system 100 is stored within an InfoSystem 302. The InfoSystem 302 roughly corresponds to an RDBMS system in a relational database model. Each InfoSystem 302 includes one or more InfoAreas 304. Each InfoArea 304 is roughly equivalent to a database in an RDBMS system. An InfoArea 304 includes one or more InfoClusters 306 which are similar to tables within an RDBMS system. An InfoCluster 306 includes one or more InfoCourses 308 and one or more InfoTypes 310 with InfoCourses 308 representing attributes and InfoTypes 310 representing data records within an InfoCluster 306. An individual field 210 in a data record 202 is represented by an InfoCell 312. Each InfoCell 312 appears in at least one InfoType 310 representing the data record 202 of the field 210 and at least one InfoCourse 308 representing an attribute corresponding to the data records 202.

In implementations having a single database, the InfoSystem 302 and InfoArea 304 are not necessary. In such systems, the InfoCluster 306 may serve as the highest-level abstraction within a fast query system 100.

Figure 4:
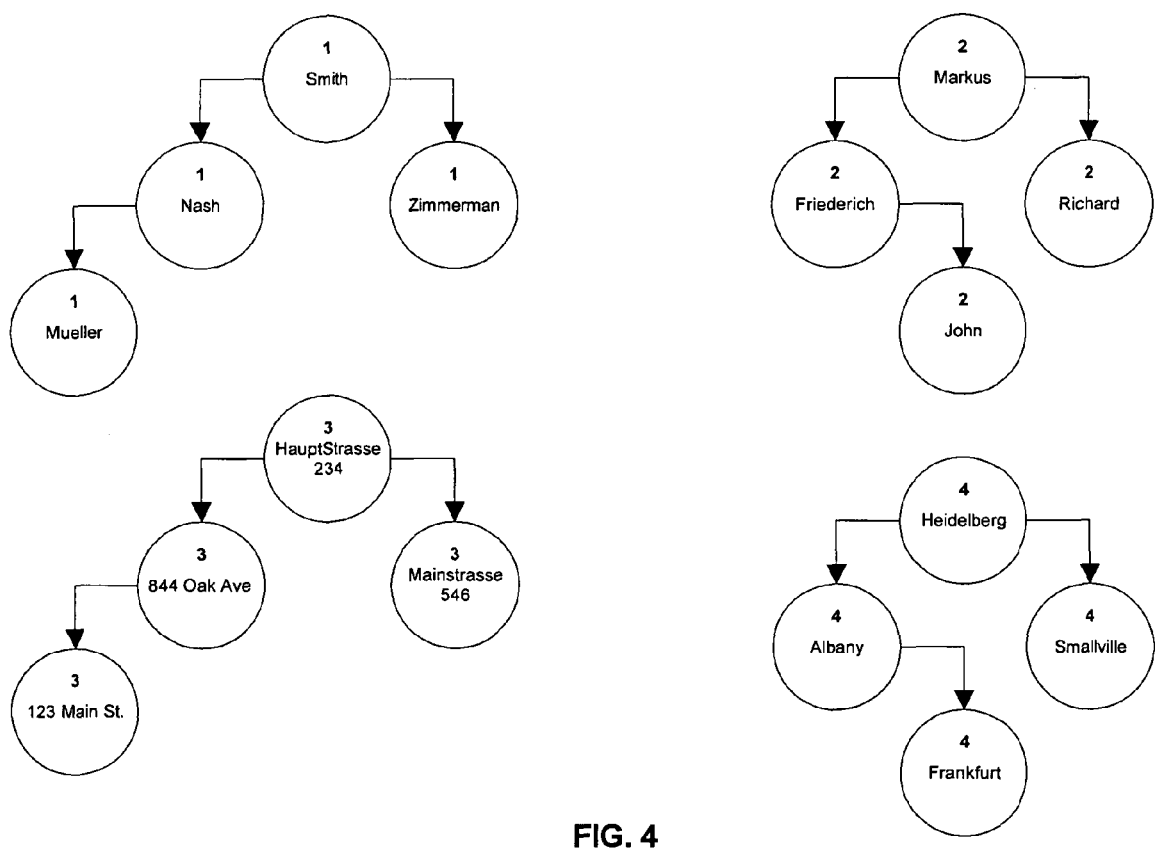
FIG. 4 is a diagram of InfoType tree structures indexing attributes within a fast query system.

Referring to FIG. 4, InfoTypes 310 and InfoCourses 308 may be implemented any indexing structure including tree structures or hash tables. For example, conventional balanced tree structures such as red-black trees and AVL trees may be used. FIG. 4 illustrates InfoTypes 310 using balanced binary trees used in an AVL index. In this example, each node within the InfoType 310 includes a left and right pointer. A node's left pointer identifies elements less than the node and a node's right pointer identifies elements greater than the node. For example, "Nash" is less than "Smith" and "Zimmerman" is greater than "Smith." The numbers on each node in FIG. 4 represent the node's InfoType 310. The number "1" represents the last name attribute 212, "2" represents the first name attribute 214, "3" represents the address attribute 216, and "4" represents the city attribute 218. Each attribute is represented by a corresponding InfoType 310.

Figure 5:
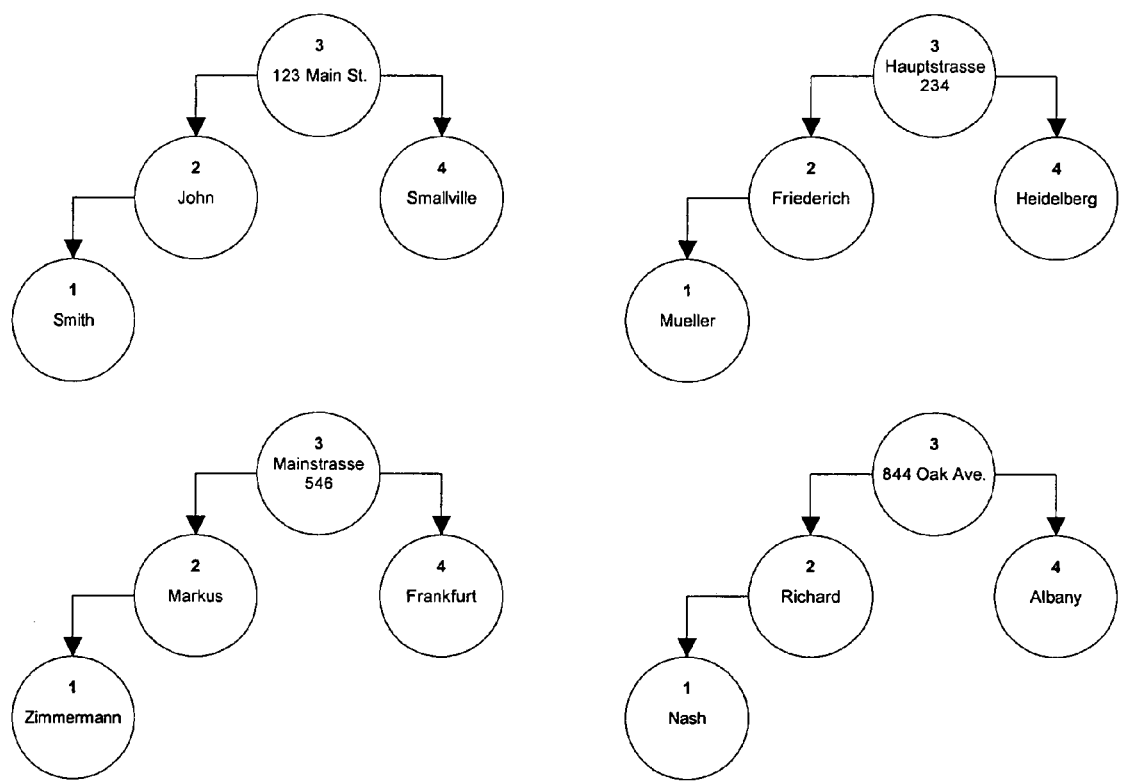
FIG. 5 is a diagram of InfoCourse tree structures indexing data records within a fast query system.

Referring to FIG. 5, InfoCourses 308 represent data records 202 in a data query system 100. The fields 210 within a data record 202 may be indexed to facilitate retrieval of a specific field 210. For example, FIG. 5 shows four AVL trees indexing fields 210 in an InfoCourse 308. Each field 210 is represented by an InfoCell 312. Alternatively, any other indexing technique may be used including, but not limited to, red-black trees, B-trees, or hash tables. In this example, an arbitrary number corresponding to an InfoType 310 is used to index the data record 202 within an InfoCourse 308. In the first tree in FIG. 5, the root node, numbered "3," stores the address attribute 216, "123 Main St." To its right is the city attribute 218, "Smallville," because its corresponding number "4" is greater than "3." To its left is the first name attribute 214, "John," with a corresponding number "2" less than "3." Finally, the last name attribute 212, "Smith," with a corresponding number "1" is to the left of the first name attribute 214.

Figure 6:
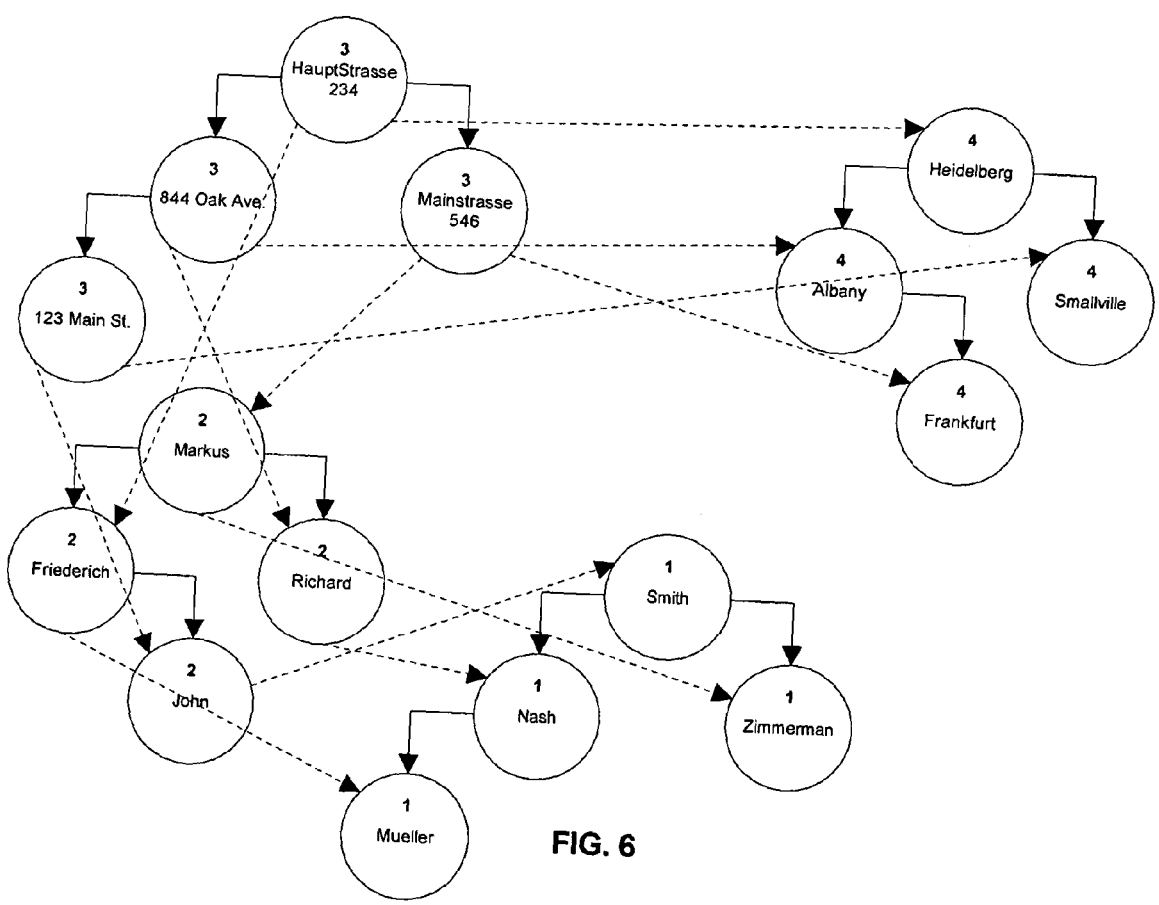
FIG. 6 is a diagram showing the relationships between InfoTypes and InfoCourses.

Referring to FIG. 6, the InfoCourse 308 and InfoType 310 data structures are integrated with one another to form an InfoCluster 306. Each node within the InfoType 310 and InfoCourse 308 data structures is represented by an InfoCell 312. This allows the system to traverse an InfoType 310 to quickly find data records 202 that satisfy a query and to traverse an InfoCourse 308 for a particular data record 202 to locate a desired field 210.

Figures 7, 8:
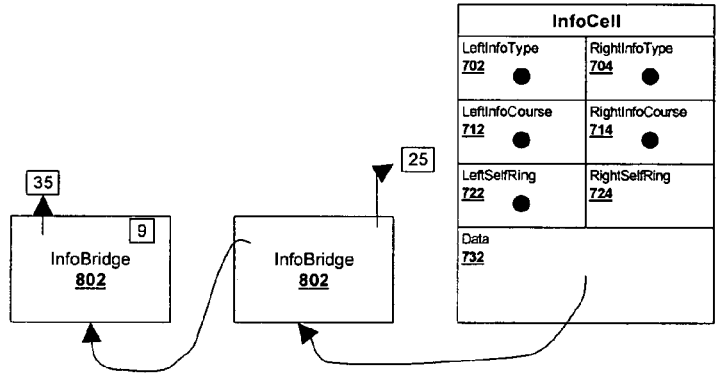
FIG. 7 is a diagram of an InfoCell data structure.
FIG. 8 is a diagram of an InfoBridge data structure.

FIG. 7 shows an exemplary InfoCell 312 data structure that may be used by InfoCourses 308 and InfoTypes 310. The InfoCell 312 includes a left InfoType pointer 702 and a right InfoType pointer 704. These pointers are used to define an InfoType 310 tree structure. For example, in FIG. 4 the InfoCell 312 for the last name attribute 212 "Smith" includes a left InfoType pointer 702 to the "Nash" InfoCell 312 and a right InfoType pointer 704 to the "Zimmerman" InfoCell 312. Some InfoCell 312 data structures do not need a left InfoType pointer 702 or a right InfoType pointer 704. Blank InfoType pointers 702 or 704 may point to the null value or may reference an anchor node of the InfoType 310. An anchor node points to the root node of the InfoType 310 so the system may begin a tree traversal or so that the system may identify when the bottom of the tree has been reached. Additionally, the root node of the tree may be located by traversing the tree until the anchor node is reached. Similarly, a left InfoCourse pointer 712 and a right InfoCourse pointer 714 are used to define an InfoCourse 308 tree structure. Each InfoCourse 308 also may include an anchor node.

If more than one InfoCell 312 in an InfoType 310 are equivalent, then the equivalent InfoCells 312 are not less than or greater than each other and so may be represented in the same location in the InfoType 310 data structure. A left self ring pointer 722 and a right self ring pointer 724 may be used to represent each equivalent InfoCell 312 in an InfoType 310 as a ring with InfoCell 312 in the InfoType 310 tree and the equivalents being linked to one another using the left self ring pointer 722 and right self ring pointer 724. Finally, data in an InfoCell 312 is stored in the data field 732. If data to be stored in the data field 732 too large to fit in the data field 732, the data may be stored elsewhere with a pointer to the data's location stored in the data field 732.

In addition to the information described above, an InfoCell 312 also may include further fields to facilitate searching. By augmenting the InfoCell 312 data structure, the data query module 102 can respond to some queries without necessitating traversal of all relevant InfoCells 312. For example, implementations may augment an InfoCell 312 to include a count field that is used to maintain a number of InfoCells 312 including that InfoCell 312 and those below it in a tree. In such an implementation, the count field of an InfoCell 312 with no nodes below it would be 1. The count field of an InfoCell 312 having only one InfoCell 312 below it would be 2. For any InfoCell 312, the count field should store the sum of the count fields of all InfoCells 312 immediately below that InfoCell 312 plus 1.

Using a count field augmentation of the InfoCell 312 data structure, a data query module 102 may determine how many records satisfy a particular query without identifying and counting each matching record. Consider, for example, the InfoType 310 shown in FIG. 4 indexing last names. In that example, "Nash" is less than "Smith" and "Zimmerman" is greater than "Smith." This data structure may be augmented to add a count field. Once augmented, the "Mueller" and "Zimmerman" InfoCells 312 would have a count of 1, the "Nash" InfoCell 312 would have a count of 2, and the "Smith" InfoCell 312 would have a count of 4. Using the count field augmentation, the data query module 102 may quickly determine the number of data records less than or equal to "Smith" by subtracting the number of data records greater than "Smith" (i.e., the count of "Zimmerman" which equals 1) from the count of "Smith". Performing this calculation, 4 minus 1, yields a total of 3 records matching the query.

Using this augmentation technique, the system may quickly determine the number of matching data records. This approach may be used to optimize queries containing multiple conditions by determining the number of matching records for each condition and then ordering the each conditions execution based on the number of data records that will be identified. This technique may be useful, for example, when two statements are logically combined using AND. Consider a query that combines a first statement A with a second statement B using logical AND. If statement A returns hundreds of thousands of data records and statement B returns 10 data records, the combination of the two statements may be performed by first querying a data store 106 for the data records matching statement B, and then using the 10 records returned to determine which, if any, satisfy statement A. This allows the statements to be combined while only traversing the 10 records matching statement B.

The numbers on each node in FIG. 4 represent the node's InfoType 310. The number "1" represents the last name attribute 212, "2" represents the first name attribute 214, "3" represents the address attribute 216, and "4" represents the city attribute 218. Each attribute is represented by a corresponding InfoType 310.

Referring to FIG. 8, the data field 732 may be used to store data of arbitrary complexity using one or more InfoBridges 802. An InfoBridge 802 is a data structure including two or more fields that may be used to store information, such as, for example, data, pointers to data, or another InfoBridge 802. In the example shown in FIG. 8, the data field 732 points to an InfoBridge 802 containing a pointer to a memory location containing the number 25 and a pointer to another InfoBridge 802. The second InfoBridge 802 contains the number 9 in one of its fields and a pointer to a memory location containing the number 35 in a second field. In this example, each InfoBridge 802 includes two memory locations. Implementations of InfoBridges 802 may include any number of fields.

Figure 9:
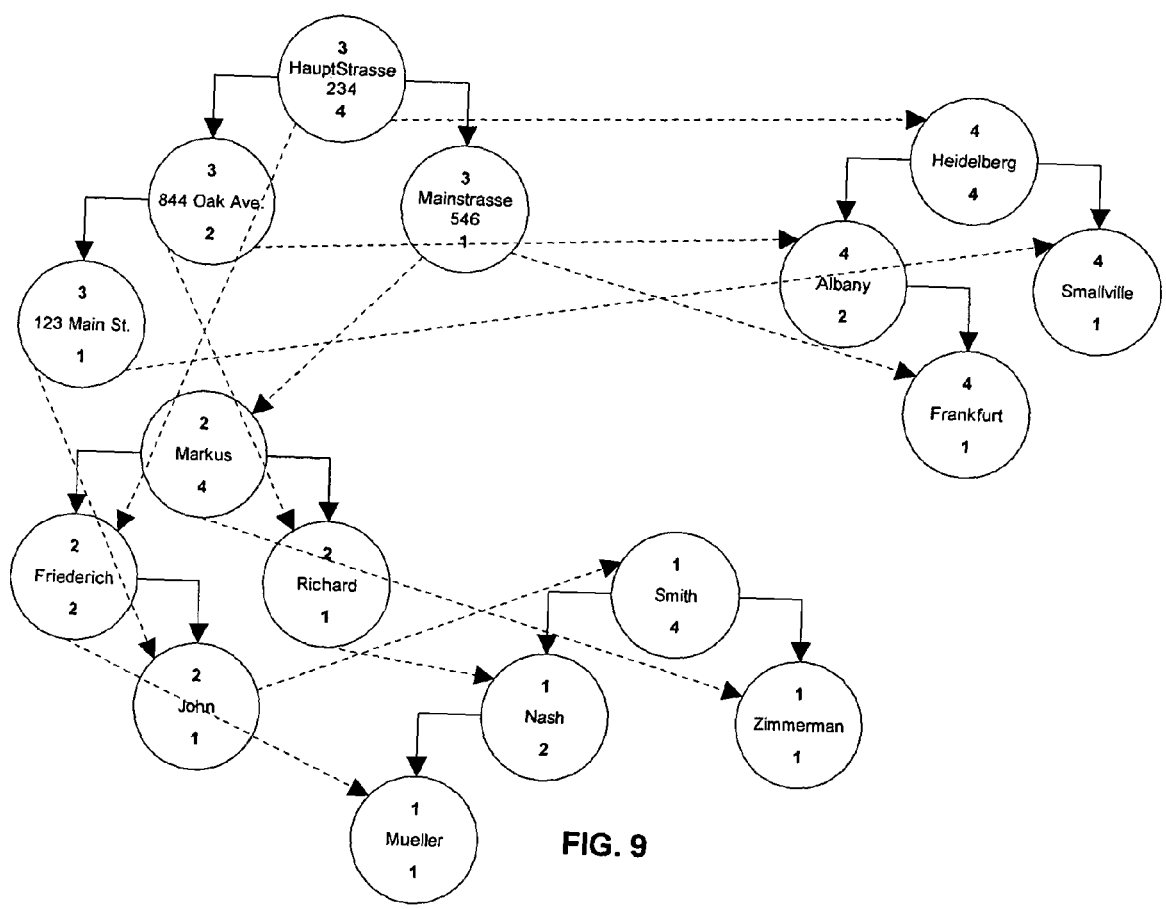
FIG. 9 is a diagram showing the relationships between InfoTypes and InfoCourses.

Referring to FIG. 9, a fast query system 100 organized as described above with reference to FIGS. 1-7 may be used to quickly search a data store 106 for data records matching a query. By tightly integrating data and index structures together, a data query module 102 may quickly identify data records from the data store 106 that satisfy a query. For example, consider the following query:

SELECT*WHERE City<"Heidelberg".

The fast query system 100 may quickly determine which records satisfy the query by traversing the InfoType 310 that stores and indexes the city attribute 218. To do this, the fast query system 100 begins at the topmost node and determines whether its contents matches the query. The system then determines that the nodes below the "Heidelberg" node match (i.e., "Albany" and "Frankfurt"). The query requests all attributes for each of the matching data records. To obtain the other attributes for these two data records, the system traverses each records InfoCourse 308.

Each of the InfoCells 312 is augmented with a count field as described above with reference to FIG. 7. The count field may be used to optimize more complex queries. For example, consider the following query:

SELECT*WHERE (City<"Heidelberg") AND (LastName>"Smith")

The system may process this query by first determining the number of data records that satisfy each query. The first query requests records having a city attribute 218 that comes before "Heidelberg" in alphabetical order. Traversing the city InfoCourse 308, the InfoCells 312 to the left of "Heidelberg" satisfy the query. In other words, the "Albany" InfoCell 312 and the nodes below it satisfy the query. The "Albany" InfoCell 312 has a count field of 2, so 2 data records satisfy the query.

The same process may be applied to the second condition (i.e., LastName>"Smith"). The nodes to the right of "Smith" are greater than "Smith", so the InfoCell 312 to the right of "Smith" includes a count of the number of data records matching this condition. In this case, 1 data record matches. Thus, the query combines two statements using logical AND. The first statement matches 2 records and the second statement matches 1 record. The smaller result set can be traversed to logically combine the results by checking each record in the smaller result set (only 1 in this case) to see if it matches the other condition(s). Here, the record matches. The attributes of the matching record may be collected by traversing the InfoType 310.

The techniques described may be used in a data store, database, business application, or any other application storing or maintaining a collection of data to facilitate search and retrieval. A number of implementations have been described. Nevertheless, it will be understood that various modifications may be made. Accordingly, other implementations are within the scope of the following claims.

What is claimed is:

1. A method including:
   loading a data table from a relational database management system, the data table including data records, and the data records each including fields associated with attributes of the data records;
   storing each field at an InfoCell node;
   organizing, for each attribute, the InfoCell nodes storing the fields associated with the each attribute into an InfoType AVL tree indexing structure;
   storing, for each InfoType AVL tree indexing structure, an attribute number associated with each attribute;
   storing, for each InfoType AVL tree indexing structure, a count field in each InfoCell node, the count field indicating a number of InfoCell nodes below a current InfoCell node in the InfoType AVL tree indexing structure;
   organizing, for each data record, the InfoCell nodes storing the fields associated with the each data record into an InfoCourse AVL tree indexing structure according to the attribute number;
   integrating the InfoType AVL tree indexing structures and the InfoCourse AVL tree indexing structures to form an InfoCluster data store;
   receiving a query requesting a quantity of records satisfying a particular query;
   determining the quantity of data records by traversing the InfoCluster data store and accessing the count field; and
   outputting the quantity of records.

2. A method including:
   loading a data table, the data table including data records, and the data records each including fields associated with attributes of the data records;
   storing each field at an InfoCell node;
   organizing, for each attribute, the InfoCell nodes storing the fields associated with the each attribute into an InfoType indexing structure;
   organizing, for each data record, the InfoCell nodes storing the fields associated with the each data record into an InfoCourse indexing structure;
   integrating the InfoType indexing structures and the InfoCourse indexing structures to form an InfoCluster data store;
   receiving a query for a desired data record and/or field;
   traversing the InfoCluster data store to select the desired data record and/or a field satisfying the query; and
   outputting the desired data record and/or the field satisfying the query.

3. The method of claim 2, wherein the query is formulated in a proprietary query language, in a standard query language, and/or in a structured query language.

4. The method of claim 2, wherein the InfoType and/or InfoCourse indexing structures are tree structures or hash trees.

5. The method of claim 4, wherein the InfoType and/or InfoCourse indexing structures are red-black tree structures or AVL tree structures.

6. The method of claim 2, wherein organizing the InfoCell nodes into an InfoType indexing structure further comprises linking left and/or right InfoType pointers of the InfoCell nodes to other InfoCell nodes in the InfoType indexing structure.

7. The method of claim 2, wherein organizing the InfoCell nodes into the InfoCourse indexing structure further comprises linking left and/or right InfoCourse pointers of the InfoCell nodes to other InfoCell nodes in the InfoCourse indexing structure.

8. The method of claim 2, further comprising linking equivalent InfoCell nodes to one another using left and right self ring pointers.

9. The method of claim 2, wherein storing each field at an InfoCell node further comprises storing each field in a data field of the InfoCell node.

10. The method of claim 2, wherein storing each field at an InfoCell node further comprises:
    storing each field at a location; and
    storing a pointer to the location in a data field of the InfoCell node.

11. The method of claim 2, further comprising storing, for each InfoType indexing structure, a count field in each InfoCell node.

12. The method of claim 2 wherein, for each InfoCell node, the count field maintains a quantity of InfoCell nodes below the each InfoCell node in the indexing structure.

13. The method of claim 2, wherein from the data table is loaded from a relational database management system.

14. A fast query system comprising:
    a data maintenance module configured to:
        load a data table from a relational database management system, the data table including data records, and the data records each including fields associated with attributes of the data records,
        store each field at an InfoCell node,
        organize, for each attribute, the InfoCell nodes storing the fields associated with the each attribute into an InfoType indexing structure,
        organize, for each data record, the InfoCell nodes storing the fields associated with the each data record into an InfoCourse indexing structure, and
        integrate the InfoType indexing structures and the InfoCourse indexing structures to form an InfoCluster data store;
    a data store configured to store the InfoCluster data store; and a data query module configured to:
  receive a query for a desired data record and/or field,
  traverse the InfoCluster data store to select the desired data record and/or a field satisfying the query, and
  output the desired data record and/or the field satisfying the query.

* * * * *